United States Patent
Harmer et al.

(10) Patent No.: US 7,421,359 B2
(45) Date of Patent: Sep. 2, 2008

(54) DETECTING BACK ELECTROMOTIVE FORCE VOLTAGE

(75) Inventors: Brent Jay Harmer, Johnstown, CO (US); KarWei Koay, Erie, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/446,730

(22) Filed: Jun. 5, 2006

(65) Prior Publication Data

US 2007/0282551 A1    Dec. 6, 2007

(51) Int. Cl.
G05B 13/04 (2006.01)
G06F 19/00 (2006.01)

(52) U.S. Cl. .................. 702/85; 318/628; 318/638; 318/650; 369/43; 369/44.25; 369/44.32; 369/44.35; 369/44.36; 700/28; 700/29; 700/31; 702/94; 702/150

(58) Field of Classification Search ........... 318/628, 318/638, 650; 327/524, 530, 538; 369/43, 369/44.25, 44.32, 44.35, 44.36; 700/28, 700/29, 31, 71, 254; 702/85, 86, 94, 95, 702/150

See application file for complete search history.

(56) References Cited

U.S. PATENT DOCUMENTS

| | | | | |
|---|---|---|---|---|
| 3,630,437 | A * | 12/1971 | Swanson | 236/51 |
| 5,023,528 | A * | 6/1991 | Saidin et al. | 318/254 |
| 5,038,247 | A * | 8/1991 | Kelley et al. | 361/154 |
| 5,270,935 | A * | 12/1993 | Dudek et al. | 701/99 |
| 5,537,310 | A * | 7/1996 | Tanake et al. | 700/31 |
| 5,949,608 | A | 9/1999 | Hunter | |
| 6,097,564 | A | 8/2000 | Hunter | |
| 6,463,211 | B1 | 10/2002 | Peritore et al. | |
| 6,472,897 | B1 * | 10/2002 | Shyr et al. | 324/765 |
| 6,643,088 | B1 | 11/2003 | Kawachi | |
| 6,744,587 | B2 | 6/2004 | Ang et al. | |
| 6,760,178 | B2 * | 7/2004 | Shibata | 360/75 |
| 6,826,007 | B1 | 11/2004 | Patton, III | |
| 6,867,943 | B2 | 3/2005 | Harmer et al. | |
| 6,930,851 | B2 | 8/2005 | Hanson et al. | |
| 6,963,466 | B2 | 11/2005 | Baum et al. | |
| 7,016,141 | B2 | 3/2006 | Bahirat et al. | |
| 7,043,374 | B2 * | 5/2006 | Wang et al. | 702/45 |
| 2001/0026414 | A1 * | 10/2001 | Shibata | 360/75 |
| 2004/0080858 | A1 | 4/2004 | Suzuki | |
| 2004/0204885 | A1 * | 10/2004 | Wang et al. | 702/100 |
| 2004/0257695 | A1 | 12/2004 | Tan et al. | |
| 2005/0126306 | A1 * | 6/2005 | Wang et al. | 73/861.77 |
| 2005/0168862 | A1 | 8/2005 | Jeong | |

FOREIGN PATENT DOCUMENTS

FR    2 248 750 A  *  6/1975
JP    2001-61292 A  *  3/2001

* cited by examiner

Primary Examiner—Edward R Cosimano
(74) Attorney, Agent, or Firm—Fellers, Snider, et al.

(57) ABSTRACT

A Bemf detect circuit is configured for modeling Bemf error via calculation of time correlations associated with two or more different non-calibrated sense resistor gain values to derive a calibrated sense resistor gain value. A method is provided for calibrating a Bemf detector circuit by setting a sense resistor gain to a plurality of different gain values, observing Bemf sample values for each of the gain values, and deriving a calibrated gain value by non-iteratively modeling the relationship between the gain values and the associated Bemf sample values.

20 Claims, 9 Drawing Sheets

DETECTING BACK ELECTROMOTIVE FORCE VOLTAGE

FIELD OF THE INVENTION

The embodiments of the present invention relate generally to the field of velocity control systems and more particularly but without limitation to continuous velocity control by detecting back electromotive force (Bemf) voltage.

BACKGROUND

Data storage devices have continually been reduced in physical size while offering increased data storage capacity. One result of these competing goals is a general trend toward controlling the actuator motion by monitoring the voice coil motor Bemf rather than by reading servo information. For example, Bemf control is used to unlatch and park the head in the landing zone in a contact-start-stop type of data storage device. For another example, Bemf control is used when using an unloading ramp to park the heads while the device is not operational. In both examples, velocity control of the actuator cannot be provided by reading the servo information because the heads are moved away from the storage medium. In order to detect the Bemf, a detection circuit is typically provided with a sense resistor placed in series with the coil of the voice coil motor. However, the detection circuit must be able to cancel voltage drop contributions attributable to the voice coil motor and the sense resistor.

In previously attempted solutions the actuator is moved to a position that prevents further movement, such as abuttingly engaging and biased against a crash stop. This ensures that any energization of the voice coil motor toward the crash stop will result in a known zero velocity. In this physically restrained arrangement, two or more different levels of current can be applied to the voice coil motor, and the sense resistor gain value, $K_{sense}$, can be iteratively adjusted until the same Bemf output is obtained for the different current levels.

This attempted solution has many disadvantages. For example, iterative convergence schemes require indeterminate and usually intolerably long calibration times in view of the system controller's requirements. Other disadvantages are associated with the physical contacting engagement required between the actuator and the abutting member, such as the crash stop. Intentional contacting engagement of the actuator against the crash stop increases the risk of shock causing head/disc contact. To minimize this risk of damage, the actuator approach velocity is made small, but this likewise contributes to a slow calibration procedure. The intentional contacting engagement also increases the risk that particulates are created by the contacting bodies.

What is needed is a solution that performs real time calculations to non-iteratively derive the calibrated $K_{sense}$ value without requiring the actuator be held stationary, such as by being biased against a crash stop. The needed solution would also provide better calibration accuracy by driving voice coil motor current in both directions rather than just one direction. The needed solution would also provide better predictability by providing a fixed-time calculation rather than an indeterminate iterative procedure. It is to these improvements that the embodiments of the present invention are directed.

SUMMARY OF THE INVENTION

Embodiments of the present invention are generally directed to an apparatus and associated method for non-iteratively and in real time calibrating a Bemf sensor.

In some embodiments a Bemf detect circuit is configured for modeling Bemf error via calculation of time correlations associated with two or more different non-calibrated sense resistor gain values to derive a calibrated sense resistor gain value.

In some embodiments a method is provided for calibrating a Bemf detector circuit by setting a sense resistor gain to a plurality of different gain values, observing Bemf sample values for each of the gain values, and deriving a calibrated gain value by non-iteratively modeling the relationship between the gain values and the associated Bemf sample values.

In some embodiments a data storage device is provided having a servo control system with a Bemf detector for velocity control of an actuator, and means for calibrating the Bemf detector.

These and various other features and advantages which characterize the claimed invention will become apparent upon reading the following detailed description and upon reviewing the associated drawings.

DETAILED DESCRIPTION

Figure 1:
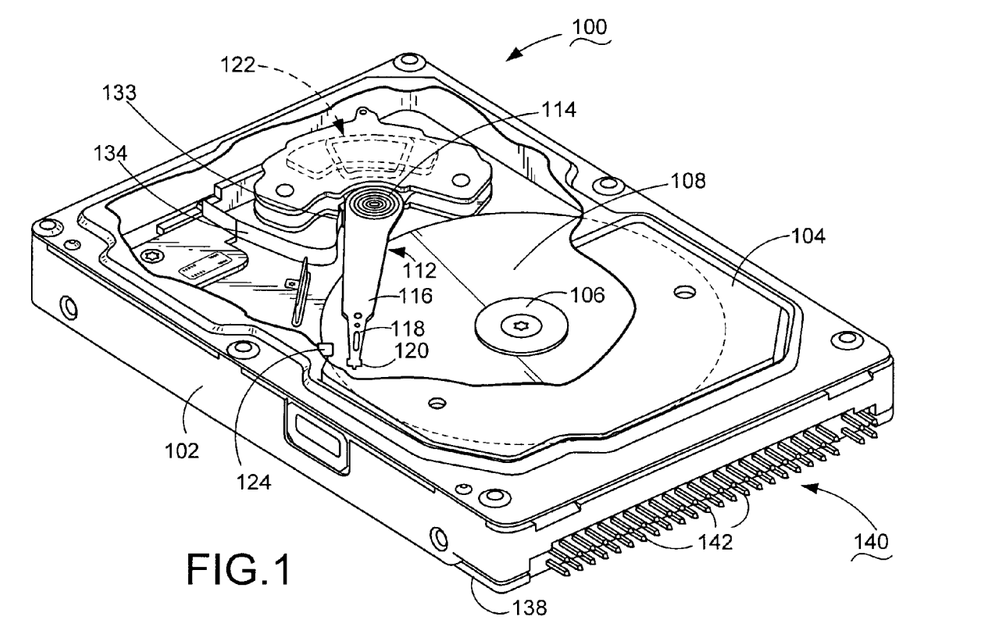
FIG. 1 is an isometric view of a data storage device constructed in accordance with embodiments of the present invention.

Referring to the drawings in general, and more particularly to FIG. 1 that shows an isometric view of a data storage device 100 constructed in accordance with embodiments of the present invention. The device 100 is provided to show an exemplary environment in which preferred embodiments of the present invention can be advantageously practiced. It will be understood, however, that the embodiments of the present invention are not so limited.

The device 100 preferably includes a base 102 and a cover 104 (partially cutaway), which together provide a housing for a number of components. The components include a motor 106 to which is fixed one or more storage mediums 108 in rotation therewith. Adjacent the storage medium 108 is an actuator assembly 112 that pivots around a bearing assembly 114 through application of current to a voice coil motor (VCM) 122. In this way, controlled operation of the VCM 122 causes the actuator 112 to move radially across the storage medium 108.

The actuator assembly 112 includes an actuator arm 116 supporting a load arm 118 that, in turn, supports a head 120 (or "transducer") at a distal end thereof in a data transfer relationship with the adjacent storage medium 108. Each storage medium 108 can be divided into data tracks, and the head 120 is positioned to retrieve data from and store data to the tracks.

Preferably, when the device is not in use, the heads 120 are moved (unloaded) to a ramp structure 124 located near an outermost periphery of the storage medium 108. The ramp structure 124 serves to provide respective surfaces on which the heads 120 can safely be disposed while the storage medium 108 is in a non-rotational state. When device I/O operation is desired, the motor 106 accelerates the storage medium 108 to a velocity sufficient to support the heads 120, and the heads 120 are moved (loaded) from the ramp structure 124 to supported positions adjacent the media 108.

While a ramp structure 124 has been provided for purposes of illustrating a preferred embodiment, such is not necessarily required. For example, embodiments that employ rotatable media and moveable heads as shown in FIG. 1 can alternatively utilize other support configurations such as a contact start stop (CSS) approach whereby the heads 120 are brought to rest upon texturized landing zones of the storage medium 108.

To provide the requisite electrical conduction paths between the head 120 and device 100 control circuitry, the head 120 advantageously has a flex circuit that is routed on the actuator assembly 112 from the head 120, along the load arm assembly 118 and the actuator arm 116, and to a circuit portion 133 that is supported by a proximal end (sometimes referred to as "E block") of the actuator assembly 112. The circuit portion 133 connects the head 120 flex circuit to another flex circuit 134 which passes through the base 102 to a printed circuit board (PCB) 138. An electrical connector 140 attached to the PCB 138 has a plurality of contacts 142 for connecting the device 100 to a mating connector (not shown), such as for placing the device 100 in communication with external control circuitry.

Figure 2:
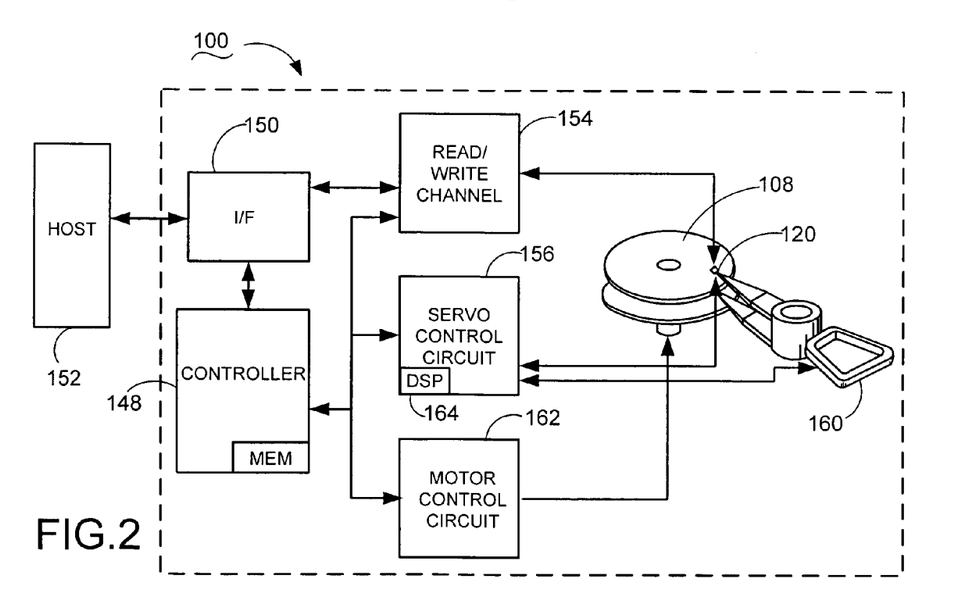
FIG. 2 is a simplified functional diagram of the data storage device of FIG. 1.

FIG. 2 provides a functional block diagram of the device 100 of FIG. 1. A programmable controller 148 provides top-level communications and control for the device 100. An interface (I/F) 150 facilitates I/O communications and transfers with a host device 152 with which the device 100 can be associated. A read/write (R/W) channel 154 conditions data to be written to the storage medium 108 from the host 152 during a write operation, and reconstructs data retrieved from the storage medium 108 for transfer to the host 152 during a retrieve operation.

A servo circuit 156 provides closed-loop positional control for the heads 120, such as by using servo data stored to the storage medium 108. The servo circuit 156 is preferably configured to carry out a number of control functions including track following operations whereby a selected head 120 follows a corresponding track on the storage medium 108, seek operations whereby a selected head 120 is moved from an initial track to a destination track, and head 120 load/unload operations whereby the heads 120 are moved away from or to the ramp structure 124.

Continuous velocity control of the actuator 112 can be accomplished using the servo data at times when the head 120 is adjacent the storage medium 108. However, when the head 120 is moved away from the storage medium 108, such as when the head 120 is moved on the ramp 124, the Bemf voltage of the VCM 122 can be used for continuous velocity control. It is the latter situation to which embodiments of the present invention are directed. However, it will also be noted that it can be advantageous to use Bemf control at times when the head 120 is adjacent the storage medium 108. For example, an error condition may occur preventing the data storage device 100 from successfully reading the servo information. Having both Bemf and servo control options available regardless of the head 120 position is preferable.

The servo circuit 156 applies the requisite currents to a coil 160 of the VCM 122 to carry out these various operations. The servo circuit 156 further preferably includes a spindle motor driver circuit 162 to controllably operate the spindle motor 106. Processing requirements to carry out these and other servo functions are preferably supplied by a DSP 164 or other processing device of the servo circuit 156, such as an ARM. The servo processing can alternatively be supplied by the top level controller 148 in a single processor environment.

Figure 3:
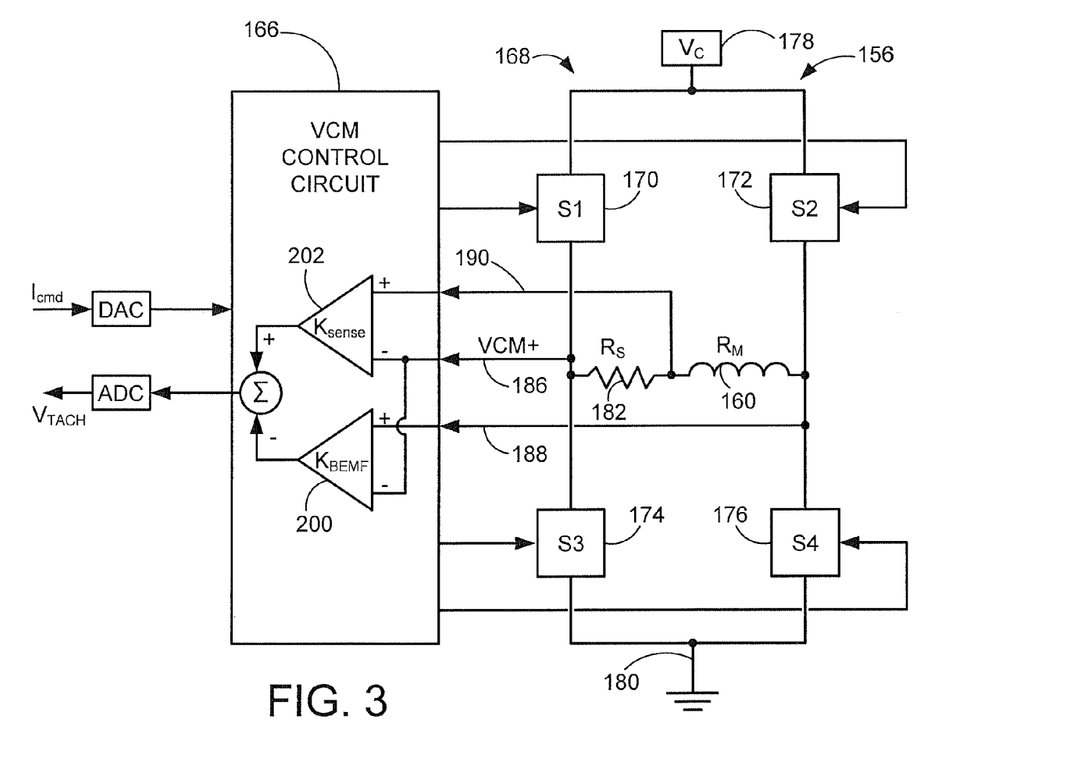
FIG. 3 is a schematic representation of control circuitry used to control operation of the voice coil motor (VCM) of the data storage device of FIG. 1.

FIG. 3 provides a generalized schematic representation of relevant portions of the servo circuit 156 of FIG. 2. A VCM control circuit 166 preferably utilizes an h-bridge driver circuit 168 to supply bi-directional currents through the VCM coil 160. Switching devices S1-S4 are numerically denoted at 170, 172, 174 and 176 and preferably comprise suitable field effect transistors (FETs). The switching devices S1-S4 are arranged between a $V_C$ voltage source 178 and a reference line (ground) 180.

In this way, current can be passed through the coil 160 in a first direction through the selective energizing (induced source-drain conduction) of switches S1 and S4, and current can be passed through the coil 160 in a second opposite direction through the selective energizing of switches S2 and S3.

A current sense resistor 182 is preferably placed in series with the coil 160 as shown. The respective steady-state resistances of the coil 160 ($R_M$) and the sense resistor 182 ($R_S$) are both preferably on the order of a few ohms. The difference between lines 186 and 188 represents the overall voltage drop across the coil 160 and the sense resistor 182; the difference between lines 186 and 190 represents the voltage drop of the sense resistor 182; and the difference between lines 188 and 190 represents the voltage drop across the coil 160.

During I/O operation of the device 100, the servo circuit 156 operates to position the heads 120 either adjacent the rotating storage medium 108 or adjacent the load/unload ramp 124. The VCM control circuit 166 is commanded by the controller 148 to provide a specified current $I_{cmd}$ (magnitude and direction) through the coil 160. At least in certain operational modes this current can be monitored using the relation $I_M = V_S/R_S$, where $I_M$ is the actual current through both coil 160 and sense resistor 182, $V_S$ is the voltage obtained from paths 186 and 190, and $R_S$ is the known (or measured) resistance of the sense resistor 182.

The VCM control circuit 166, in turn, has circuitry that continuously provides a voltage $V_{tach}$ that is proportional to the Bemf of the VCM 122. This information can be used by the controller 148 in ascertaining the velocity of the actuator 112 at times when the servo information is unavailable, such as when the heads 120 are being moved on the ramp structure 124. The circuitry must effectively cancel the voltage drop associated with the coil 160 and the sense resistor 182 so that a calculated $V_{tach}$ error is entirely the result of Bemf error.

The cancellation circuitry in some embodiments as illustrated in FIG. 3 connects line 186 to inverting sides of operational amplifiers $K_{BEMF}$ 200 and $K_{sense}$ 202. Line 188 is connected to the non-inverting side of $K_{BEMF}$ 200, and line 190 is connected to the non-inverting side of $K_{sense}$ 202. $K_{sense}$ is calibrated such that:

$$I_M(R_M+R_S)K_{BEMF}=I_M R_S K_{sense} \qquad (1)$$

When $K_{sense}$ is thus properly calibrated there is no error voltage imparted to $V_{tach}$ by the voltage drop across the VCM 122 and sense resistor 182. That is, with a correctly calibrated $K_{sense}$ no time correlation exists between a commanded $I_{cmd}$ and the resulting $V_{tach}$. In this case, the following relationship exists:

$$V_{tach} = Bemf(K_{BEMF}) + L_M\left(\frac{dI_M}{dt}\right)K_{BEMF} \qquad (2)$$

Under steady state conditions this relationship is simplified to:

$$V_{tach}=Bemf(K_{BEMF}) \qquad (3)$$

According to this relationship, the degree of $V_{tach}$ error is directly related to the degree to which $K_{sense}$ is incorrectly calibrated. The present embodiments model this expectation of Bemf error by employing a real time error calculation of time correlations associated with two or more different non-calibrated $K_{sense}$ values, in order to derive the calibrated $K_{sense}$ value. For example, observed error resulting from a known condition wherein $K_{sense}$ is incorrectly calibrated can be defined by obtaining a Bemf sample during a bipolar command current cycle:

$$V_{tach}error = \sum_{t_0}^{t_n} I_{cmd} V_{tach} \qquad (4)$$

By performing this calculation for two or more different selected $K_{sense}$ values, the observed Bemf samples can be used to construct the model of the $V_{tach}$ error values over a range of non-calibrated $K_{sense}$ values. Curve-fitting techniques can then be applied to the model to non-iteratively select the calibrated $K_{sense}$ value associated with a $V_{tach}$ error value of zero.

Figure 4:
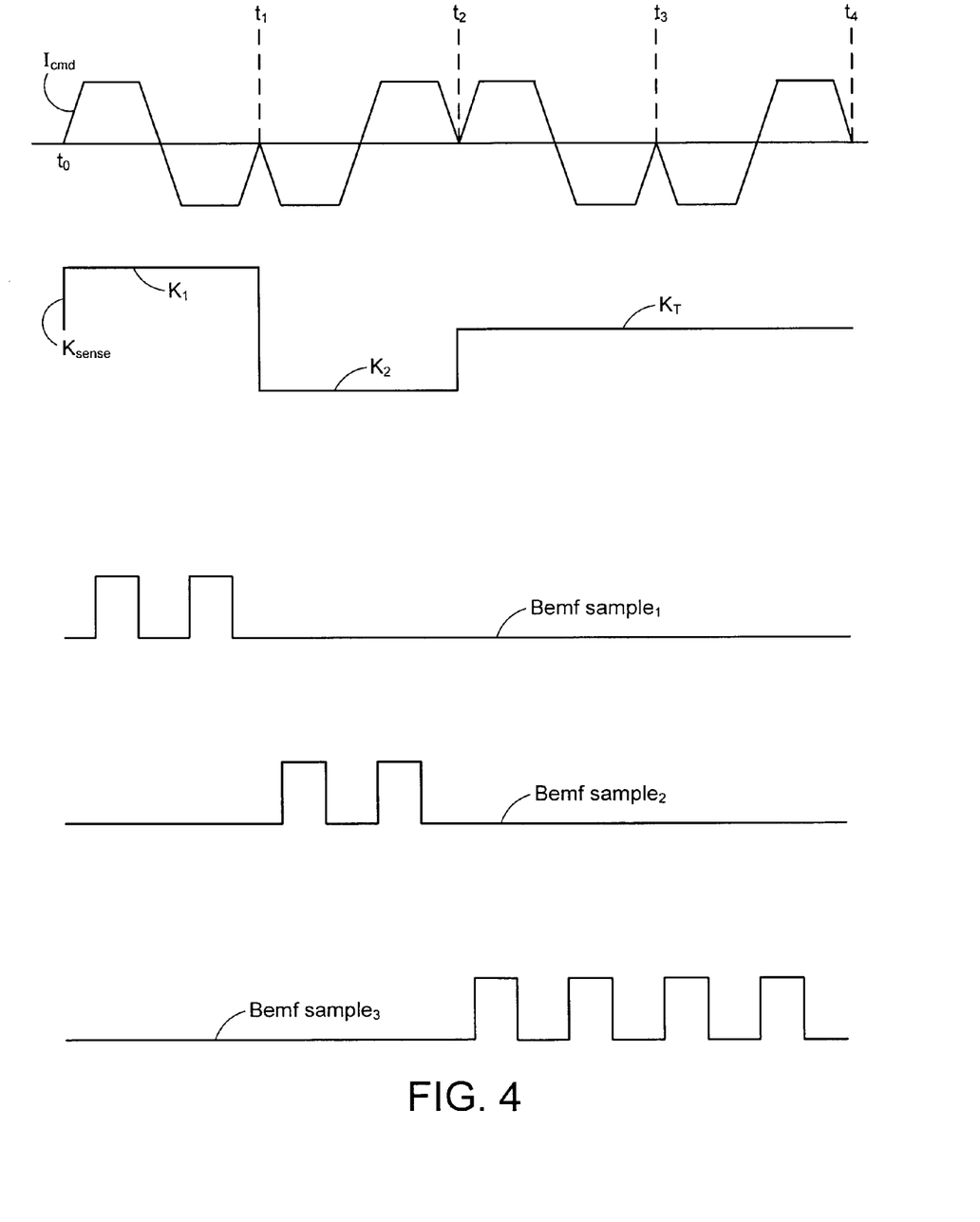
FIG. 4 diagrammatically illustrates stacked waveforms showing timing sequences of command current, sense resistor gain, and Bemf sampling strobes performed by the apparatus and method of the present embodiments.

For example, FIG. 4 has a number of stacked waveforms illustrating a method of calibrating $K_{sense}$ in accordance with embodiments of the present invention. The top waveform is a bipolar current representing $I_{cmd}$. Four current cycles are shown, the first current cycle beginning at time $t_0$ and ending at $t_1$, the other three current cycles beginning at the end of the previous current cycle and ending, respectively, at $t_2$, $t_3$, and $t_4$.

Figure 5:
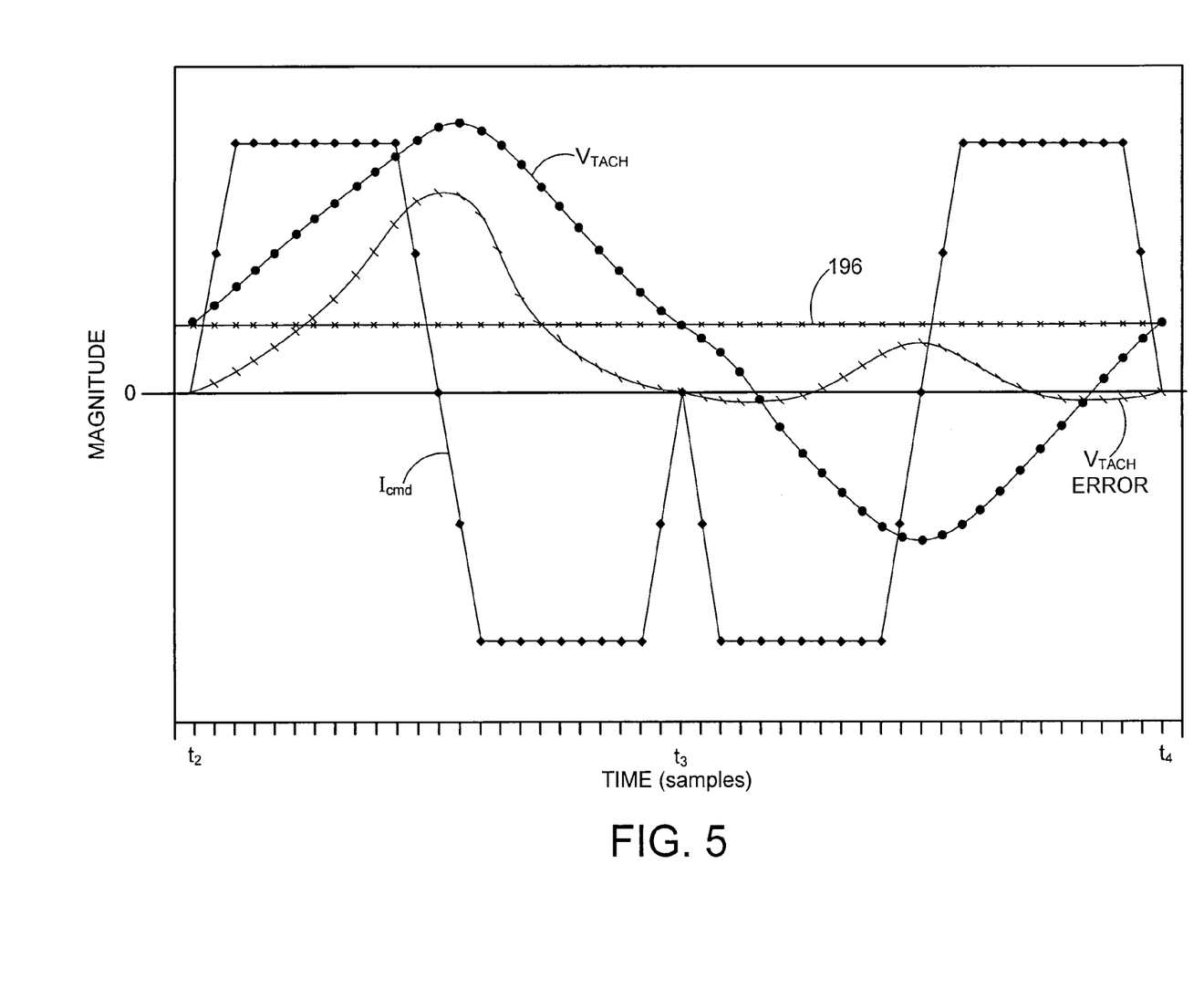
FIGS. 5 and 6 diagrammatically compares the effect of the command current of FIG. 4 on $V_{tach}$ and $V_{tach}$ error in the presence of an actuator constant velocity disturbance and an actuator constant acceleration disturbance, respectively.
Figure 6:
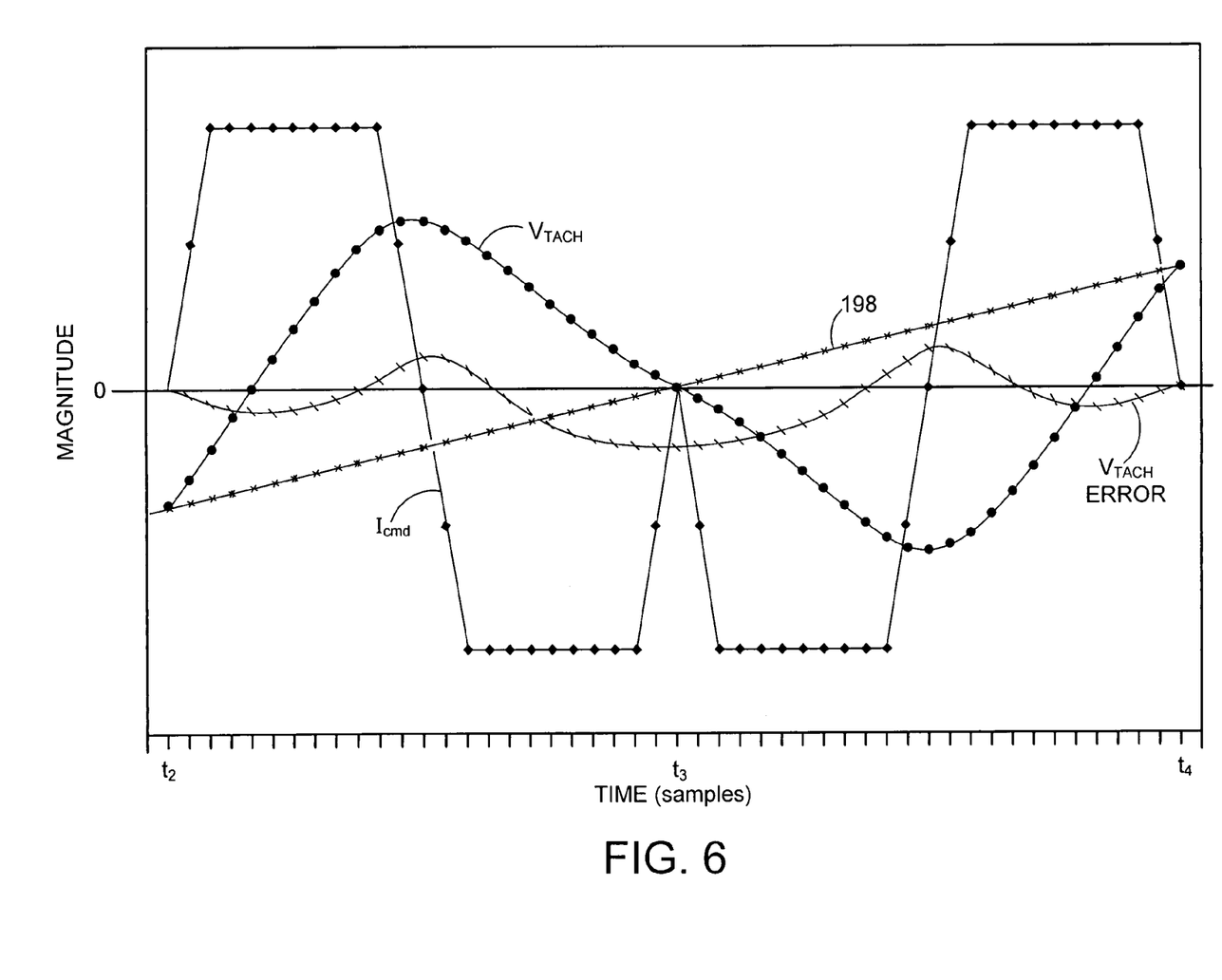

It will be noted in the illustrative embodiments of FIG. 4 for $I_{cmd}$ that at time $t_3$ an ending of one bipolar current cycle is of the same polarity (in this case negative) as a beginning of the next bipolar current cycle ("dual bipolar cycles"). FIG. 5 is simulation data showing responses Of $V_{tach}$ (equation 3) and $V_{tach}$ error (equation 4) in relation to $I_{cmd}$ and in the presence of an actuator constant velocity disturbance (or DC offset) 196. FIG. 6 is similar data but demonstrating responses in the presence of an actuator constant acceleration disturbance 198. In both cases it will be noted that by making $I_{cmd}$ both bipolar and of dual opposing bipolar cycles, $V_{tach}$ error (equation 4) converges to zero within the interval from t2 to t4, just two bipolar cycles of $I_{cmd}$. This insensitivity to constant velocity and constant acceleration disturbances demonstrates the robustness of the calibration procedure of the present embodiments.

Returning to FIG. 4, below the $I_{cmd}$ waveform is a $K_{sense}$ waveform which is set at a significantly higher than nominal value, $K_1$, during the first current cycle of $I_{cmd}$, and which is then set at a significantly lower than nominal value, $K_2$, during the second current cycle. $K_{sense}$ is then set to a target (calibrated) value, $K_T$, during the third and fourth current cycles. The value of $K_T$ results from the calibration operations performed during the first and second current cycles.

Below the $K_{sense}$ waveform are three strobe window waveforms that illustrate the intervals over which each Bemf sample is obtained. That is, Bemf sample$_1$ is obtained by summing instantaneous values of a first strobe window (within the positive polarity portion of $I_{cmd}$) with instantaneous values of a second strobe window (within the negative polarity portion of $I_{cmd}$) during the first interval while $K_{sense}$ is set to $K_1$. Similarly, Bemf sample$_2$ is obtained during the second interval while $K_{sense}$ is set to $K_2$.

Figure 7:
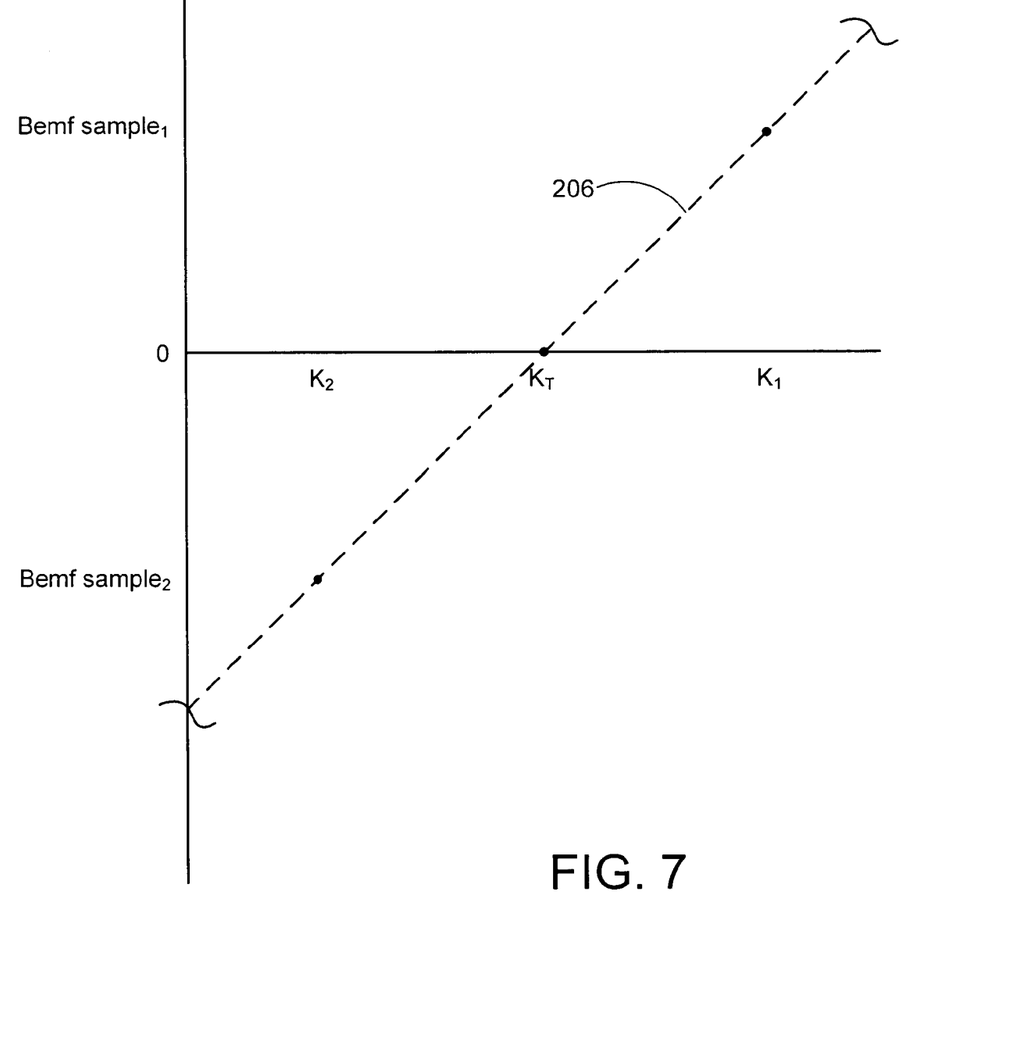
FIG. 7 is a model of expected $V_{tach}$ error over a range of sense resistor gains that is constructed in accordance with embodiments of the present invention.
Figure 8:
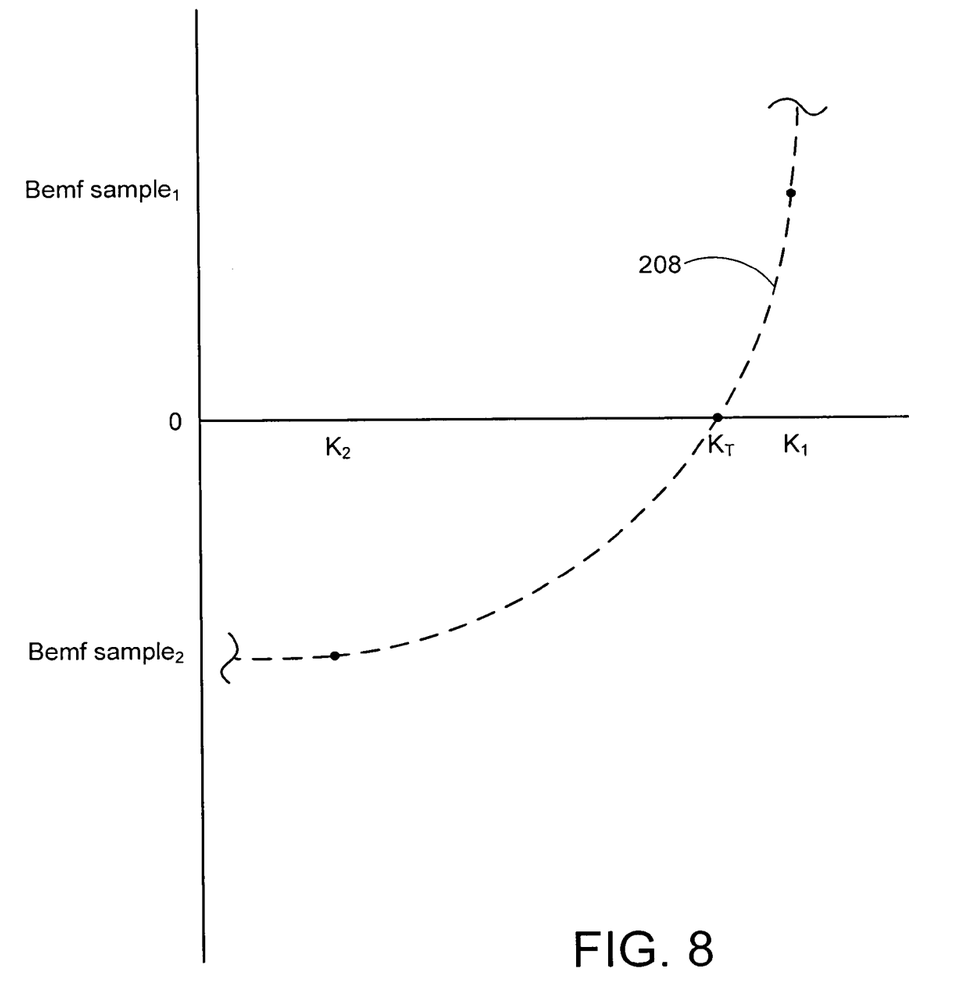
FIG. 8 is a model of expected $V_{tach}$ error over a range of sense resistor gains that is constructed in accordance with alternative embodiments of the present invention.
Figure 9:
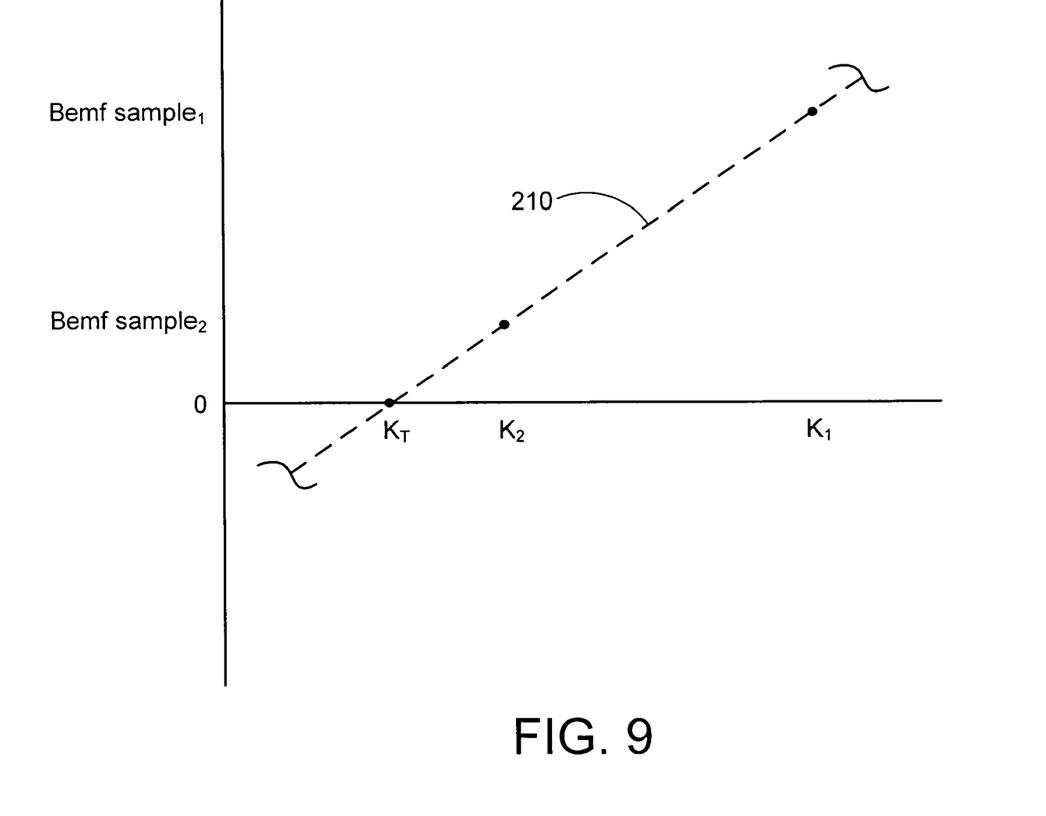
FIG. 9 is a model of expected $V_{tach}$ error over a range of sense resistor gains that is constructed in accordance with alternative embodiments of the present invention.

FIG. 7 graphically shows illustrative embodiments whereby a curve fitting technique is used on two observed Bemf samples and corresponding $K_{sense}$ values to construct a mathematical model 206 of the expected values therebetween and therebeyond. This model is used to derive the calibrated value, $K_T$, associated with a Bemf sample value of zero. It will be noted that the model 206 employs linear interpolation between the data pairs. However, FIG. 8 illustrates equivalent alternative embodiments employing a non-linear interpolation technique to construct the model 208. Furthermore, FIG. 9 illustrates other equivalent alternative embodiments whereby a curve fitting technique is used to extrapolate beyond the data pairs (either linearly or nonlinearly) to construct the model 210.

Returning to FIG. 4, as mentioned above $K_{sense}$ is set to the newly derived calibrated value, $K_T$, during the third and fourth current cycles of $I_{cmd}$. The Bemf sample$_3$ is obtained during these cycles and compared to a predetermined threshold value in order to ensure that a robust calibration has been achieved. If Bemf sample$_3$ exceeds the threshold, then the calibration procedure is repeated until the threshold is satisfied.

Figure 10:
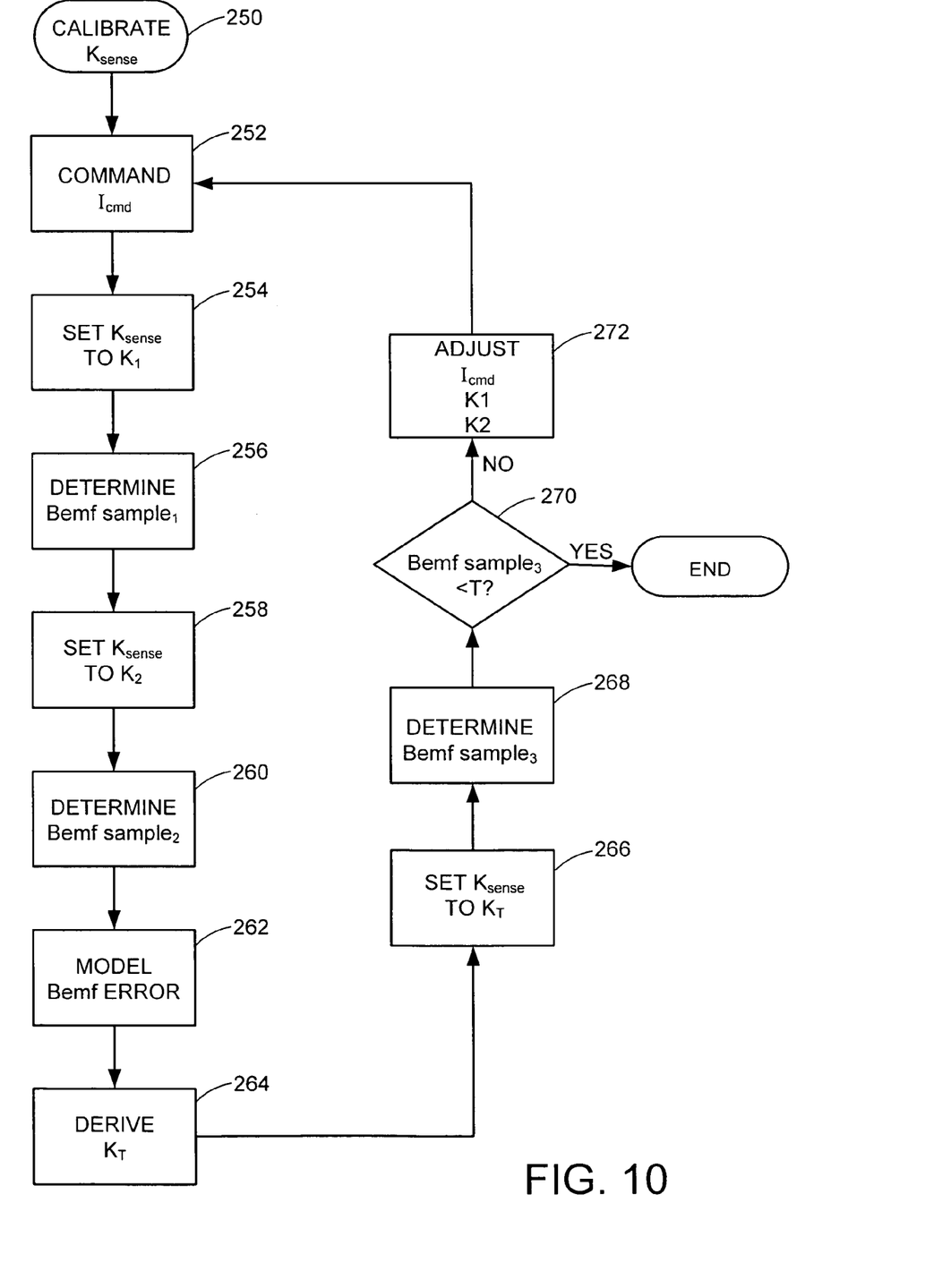
FIG. 10 is a flowchart of illustrative steps in a method for CALIBRATING $K_{sense}$ in accordance with embodiments of the present invention.

FIG. 10 is a flowchart of illustrative steps for performing a CALIBRATING $K_{sense}$ method 250 in accordance with embodiments of the present invention. The method begins by the controller 148 commanding a bipolar current $I_{cmd}$ in block 252. Control then passes to block 254 where the VCM control circuit 166 sets $K_{sense}$ to the first gain $K_1$ value (see FIG. 4). The Bemf sample$_1$ is determined during the first current cycle in block 256. Control then passes to block 258 where the VCM control circuit 166 sets $K_{sense}$ to the second gain $K_2$. The Bemf sample$_2$ is determined during the second current cycle in block 260.

In block 262 the gain values and Bemf samples are used to construct a model of the expected Bemf error over a range of non-calibrated $K_{sense}$ values. Based on the model, block 264 derives the calibrated sense resistor gain value, $K_T$, from the Bemf error value of zero.

In block 266 the VCM control circuit 166 sets $K_{sense}$ to $K_T$, and then in block 268 the Bemf sample$_3$ is determined. The Bemf sample$_3$ is compared to a preselected threshold in decision block 270. If the determination of block 270 is yes, then the method ends. Otherwise, control passes to block 272 where the values for $I_{cmd}$, $K_1$, and $K_2$ can be adjusted as desired and then the calibration procedure is repeated beginning at block 252.

Finally, in some embodiments the circuit and associated method described above reside in the data storage device 100 as illustrated in FIG. 1 to provide continuous velocity control of the actuator 112. Accordingly, the data storage device is characterized by a servo control system 156 having a Bemf detector circuit 166 and means for calibrating the Bemf detector circuit. For purposes of this detailed description and the appended claims, the meaning of "means for calibrating" expressly contemplates embodiments whereby a real time error calculation of the time correlations associated with Bemf error from a non-calibrated $K_{sense}$ condition is performed to non-iteratively derive the calibrated $K_{sense}$ value. The term "means for calibrating" expressly does not contemplate previously attempted solutions requiring an iterative convergence analysis, or that in some way restricts the movement of the actuator during calibration in order to force the Bemf to a zero value.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. A method for calibrating a Bemf detector circuit comprising:
    setting a gain value on a voltage drop across a sense resistor to each of a plurality of different gain values, each gain value set independently of the sense resistor value and set during respective different current cycles of the same command current;
    observing Bemf sample values for each of the gain values; and
    deriving a calibrated gain value by non-iteratively modeling the relationship between the gain values and the associated Bemf sample values.

2. The apparatus of claim 1 wherein the deriving step is characterized by linearly modeling the relationship between the gain values and the associated Bemf sample values.

3. The method of claim 1 wherein the deriving step is characterized by non-linearly modeling the relationship between the gain values and the associated Bemf sample values.

4. The method of claim 1 wherein the deriving step is characterized by verifying the calibrated gain value by comparing a Bemf sample value associated wit the calibrated gain value to a predetermined threshold.

5. The method of claim 1 wherein the setting step is characterized by selling the gain value to a plurality of non-calibrated gain values.

6. The method of claim 5 wherein the observing step is characterized by summing a plurality of instantaneous Bemf readings during a bipolar current cycle.

7. The method of claim 6 wherein the observing step is characterized by summing first and second Bemf readings during adjacent bipolar current cycles, wherein a trailing end of one of the adjacent bipolar current cycles is of the same polarity as a leading end of the other of the adjacent bipolar current cycles.

8. The method of claim 6 wherein the deriving step is characterized by curve filling two or more Bemf sample values.

9. The method of claim 8 wherein the deriving step is characterized by interpolating between first and second Bemf sample values.

10. The method of claim 8 wherein the deriving step is characterized by extrapolating from first and second Bemf sample values.

11. An apparatus for controlling velocity of a motor, comprising:
    a current driver having a sense resistor in series with the motor; and
    a Bemf detector coupled to the motor, comprising:
        a first amplifier outputting a signal that is proportional to a voltage drop across the sense resistor;
        a second amplifier outputting a signal that is proportional to a voltage drop across the combination of the sense resistor in series with the motor; and
        means for calibrating the Bemf detector during a non-zero velocity condition of the motor by non-iteratively modeling a response of the Bemf detector to different gain values applied to the first amplifier.

12. A system for controlling velocity of a motor, comprising:
    a current driver having a sense resistor in series with the motor;
    a motor controller comprising:
        a first amplifier outputting a signal that is proportional to a voltage drop across the sense resistor;
        a second amplifier outputting a signal that is proportional to a voltage drop across the combination of the sense resistor in series with the motor; and
        processing instructions that are executable to set a gain value of the first amplifier to different first and second gain values during the same command current and monitor respective responses of the amplifiers to model expected back electromagnetic force (Bemf) error values associated with a continuum of gain values in a range between the first and second gain values.

13. The system of claim 12 wherein the processing instructions are executable to identify a calibrated gain value for the first amplifier that is associated with a zero Bemf error value from the model of expected Bemf error values.

14. The system of claim 13 wherein the processing instructions are executable to interpolate the calibrated gain value between the first and second gain values in the model of expected Bemf error values.

15. The system of claim 13 wherein the processing instructions are executable to extrapolate the calibrated gain value beyond the first and second gain values in the model of expected Bemf error values.

16. The system of claim 12 wherein the processing instructions are executable to set the gain value to the first gain value during a first current cycle of the command current, and to set the gain value to the second gain value during a second current cycle of the command current.

17. The system of claim 16 wherein the processing instructions are executable to derive a Bemf error value associated with the first gain value by summing a first plurality of instantaneous responses of the amplifiers during a positive polarity portion of the first current cycle with a second plurality of instantaneous responses of the amplifiers during a negative polarity portion of the first current cycle.

18. The system of claim 17 wherein the processing instructions are executable to derive a Bemf error value associated with the second gain value by summing a third plurality of instantaneous responses of the amplifiers during a negative polarity portion of the second current cycle with a fourth plurality of instantaneous responses of the amplifiers during a positive polarity portion of the second current cycle, wherein the negative polarity portion of the second current cycle begins at an end of the negative polarity portion of the first current cycle.

19. The system of claim 16 wherein the processing instructions are executable to set the first amplifier to the calibrated gain value during a third current cycle of the command current, to derive a Bemf error value associated with the calibrated gain value by summing a fifth plurality of instantaneous responses of the amplifiers during a positive polarity of the third current cycle with a sixth plurality of instantaneous responses of the amplifiers during a negative polarity of the third current cycle, and to compare the derived Bemf error value associated with the calibrated gain value with a threshold.

20. The system of claim 19 wherein the processing instructions are executable to modify the first and second gain values and monitor respective responses of the amplifiers to re-model expected Bemf error values associated with a continuum of gain values in a range between the modified first and second gain values if the derived Bemf error value associated with the calibrated gain value is beyond a predetermined margin from the threshold.

* * * * *

UNITED STATES PATENT AND TRADEMARK OFFICE
CERTIFICATE OF CORRECTION

PATENT NO. : 7,421,359 B2  
APPLICATION NO. : 11/446730  
DATED : September 2, 2008  
INVENTOR(S) : Brent J. Harmer et al.

Page 1 of 1

It is certified that error appears in the above-identified patent and that said Letters Patent is hereby corrected as shown below:

In Col. 7, line 60  
replace "by selling the"  
with --by setting the.--

In Col. 8, line 5  
replace "curve filling two"  
with --curve fitting two.--

Signed and Sealed this

Twenty-first Day of October, 2008

JON W. DUDAS  
*Director of the United States Patent and Trademark Office*